United States Patent
Mao

(10) Patent No.: US 9,831,919 B2
(45) Date of Patent: Nov. 28, 2017

(54) TRANSMISSION INTERFACE DEVICE AND SYSTEM THEREOF

(71) Applicant: NATIONAL TAIWAN UNIVERSITY, Taipei (TW)

(72) Inventor: Shau-Gang Mao, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 38 days.

(21) Appl. No.: 14/244,003

(22) Filed: Apr. 3, 2014

(65) Prior Publication Data

US 2014/0302780 A1 Oct. 9, 2014

(30) Foreign Application Priority Data

Apr. 3, 2013 (TW) .............................. 102112093 A

(51) Int. Cl.
*H04B 5/00* (2006.01)

(52) U.S. Cl.
CPC ......... *H04B 5/0037* (2013.01); *H04B 5/0031* (2013.01); *H04B 5/0075* (2013.01)

(58) Field of Classification Search
CPC ....................................................... H04B 5/02
USPC ....................................................... 455/41.1
See application file for complete search history.

(56) References Cited

U.S. PATENT DOCUMENTS

| | | | |
|---|---|---|---|
| 8,310,200 B2 * | 11/2012 | Matouka | H02J 7/025 320/108 |
| 2007/0164868 A1 * | 7/2007 | Deavours | G06K 19/07749 340/572.7 |
| 2009/0322285 A1 * | 12/2009 | Hautanen | H01Q 1/243 320/137 |
| 2010/0184371 A1 * | 7/2010 | Cook | H02J 5/005 455/41.1 |
| 2010/0190435 A1 * | 7/2010 | Cook | H02J 5/005 455/41.1 |
| 2010/0190436 A1 * | 7/2010 | Cook | H04B 5/00 455/41.1 |
| 2010/0194334 A1 * | 8/2010 | Kirby | H01M 10/46 320/108 |
| 2010/0279606 A1 * | 11/2010 | Hillan | H04B 5/00 455/41.1 |

(Continued)

FOREIGN PATENT DOCUMENTS

| | | |
|---|---|---|
| CN | 201029049 Y | 2/2008 |
| CN | 102542324 A | 7/2012 |
| CN | 102882545 A | 1/2013 |

*Primary Examiner* — April G Gonzales
(74) *Attorney, Agent, or Firm* — Li & Cai Intellectual Property (USA) Office

(57) ABSTRACT

An exemplary embodiment of the present disclosure illustrates a transmission interface device, and the transmission interface device comprises an antenna body. The antenna body comprises at least one electric coupling body and at least one magnetic coupling body at least covering or surrounding portion of the electric coupling body. When the antenna of the electronic device is close to the antenna body, the antenna body and the antenna of the electronic device selectively generate an electric coupling effect, a magnetic coupling effect, or a strong electromagnetic coupling effect, such that the transmission interface device can wirelessly charge the electronic device, or alternatively the transmission interface device and the electronic device can perform a power or data transmission.

26 Claims, 16 Drawing Sheets

(56) References Cited

U.S. PATENT DOCUMENTS

| | | | |
|---|---|---|---|
| 2011/0009057 A1* | 1/2011 | Saunamaki | H02J 7/025 455/41.1 |
| 2012/0153016 A1* | 6/2012 | Slaby | G06F 1/1626 235/375 |
| 2012/0164943 A1* | 6/2012 | Bennett | G06Q 20/3674 455/41.1 |
| 2012/0309308 A1* | 12/2012 | Kim | B60L 11/182 455/41.1 |
| 2013/0035034 A1* | 2/2013 | Kim | H04B 5/0037 455/41.1 |
| 2013/0162203 A1* | 6/2013 | Kamata | H02J 7/025 320/108 |
| 2014/0065956 A1* | 3/2014 | Yang | H04B 5/0012 455/41.1 |
| 2014/0117927 A1* | 5/2014 | Chateau | H04B 5/0075 320/108 |
| 2015/0118957 A1* | 4/2015 | Schaefer | H04W 4/008 455/41.1 |

* cited by examiner

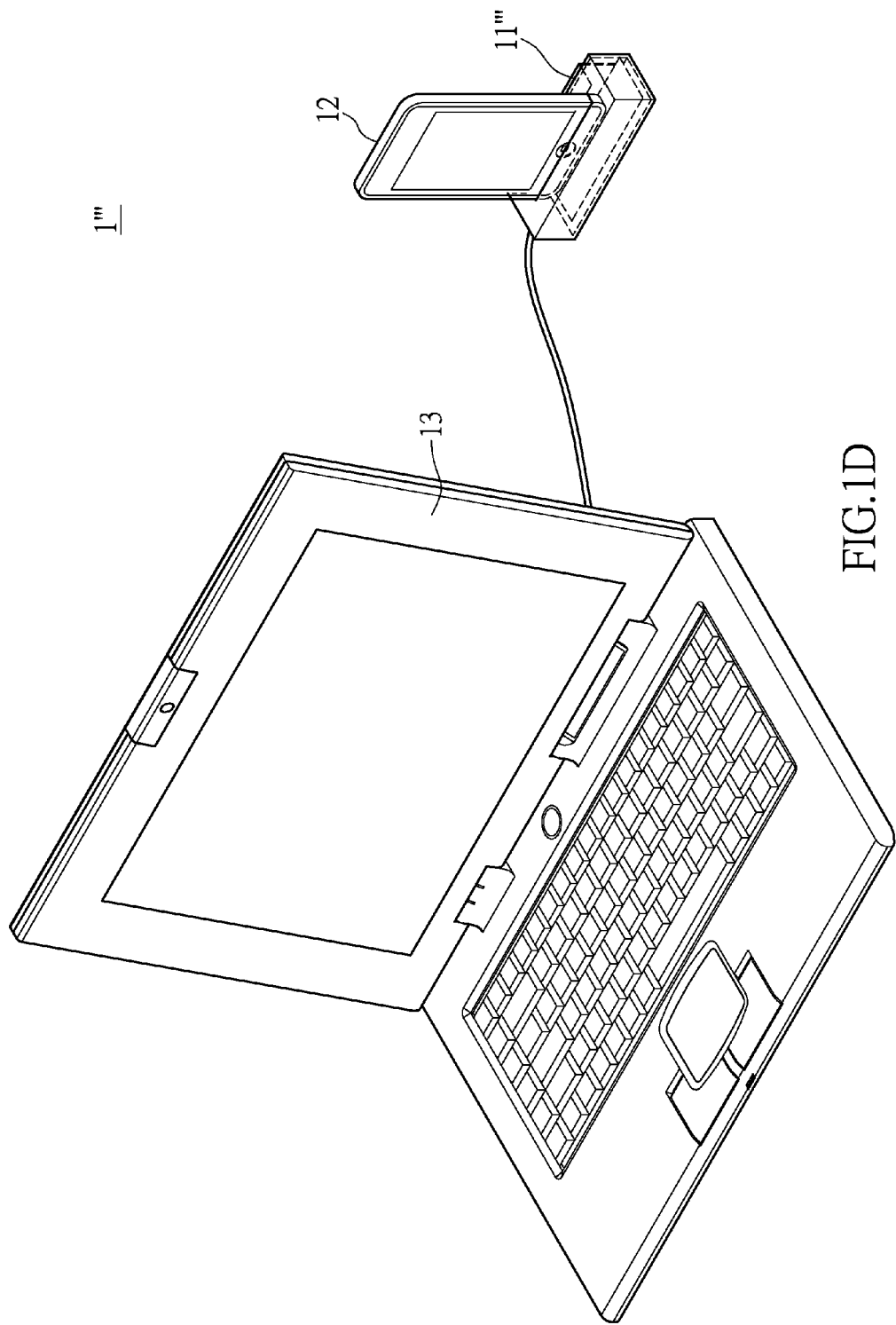

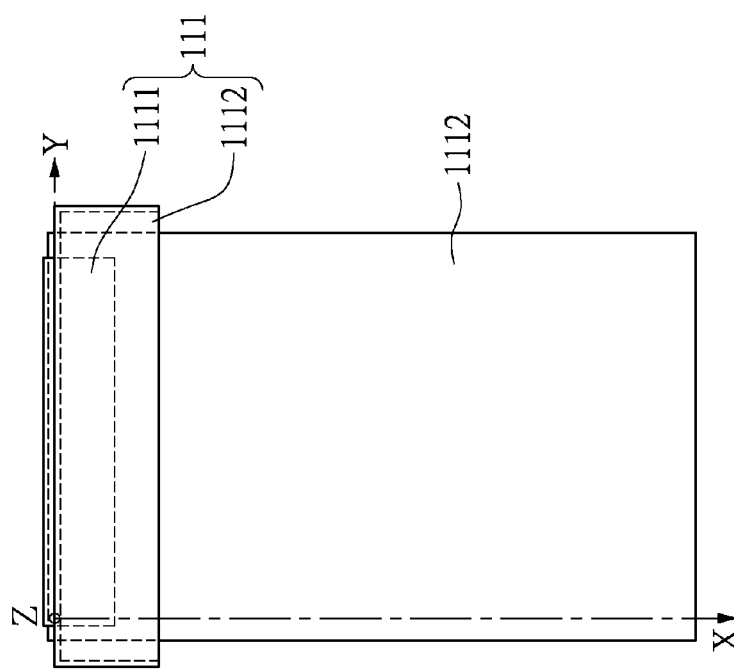
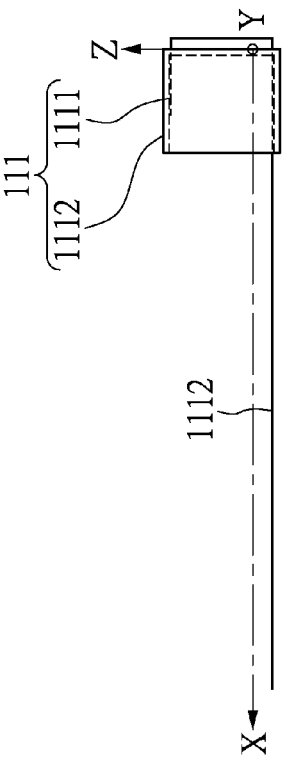
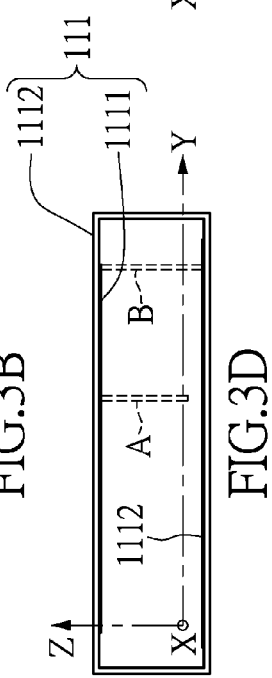
FIG.3B
FIG.3C
FIG.3D

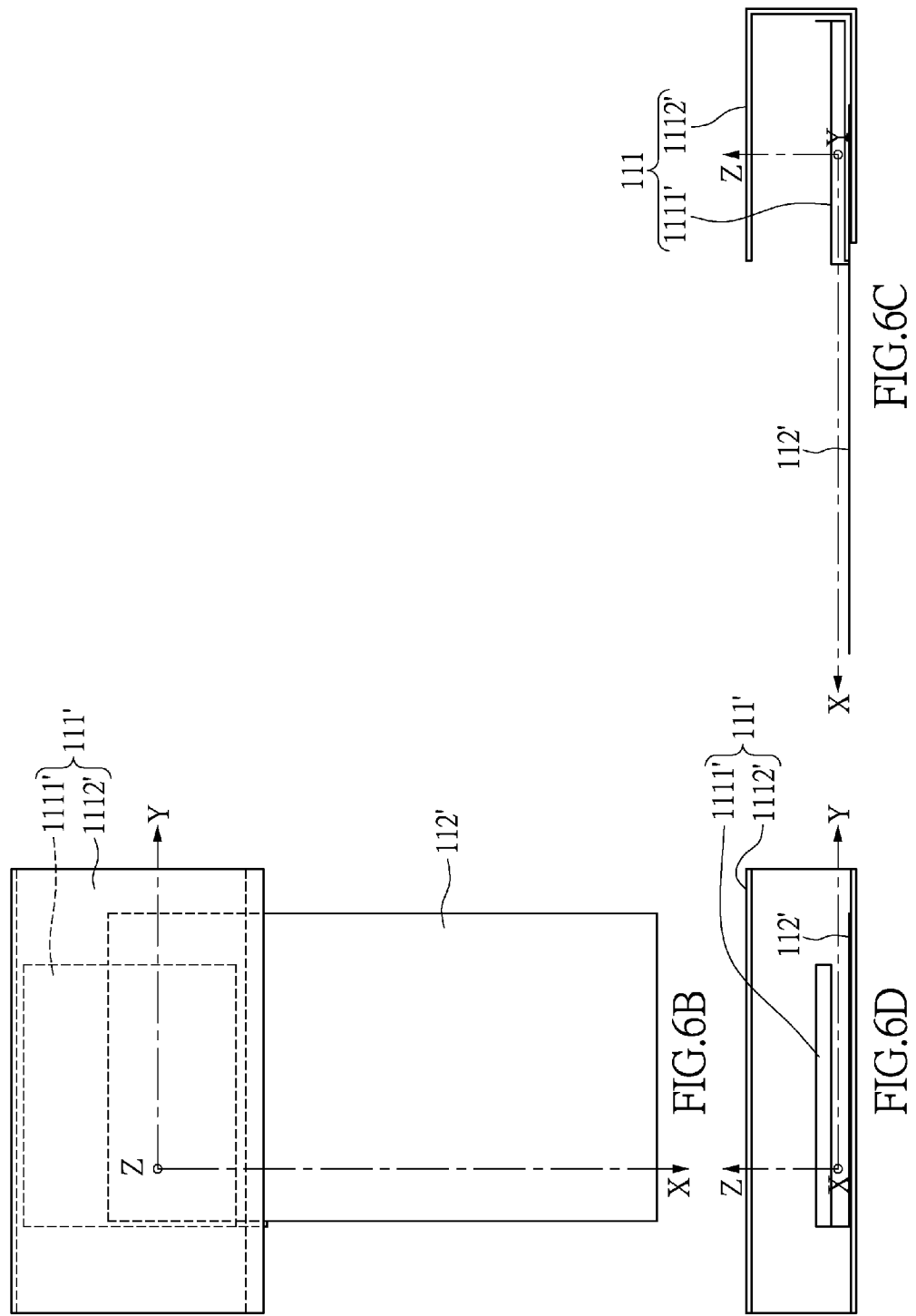

TRANSMISSION INTERFACE DEVICE AND SYSTEM THEREOF

BACKGROUND

1. Technical Field

The present disclosure relates to a transmission interface device, in particular, to a transmission interface device and a system thereof for the near field communication or wireless charging.

2. Description of Related Art

Conventionally, electronic device (e.g., mobile phone or tablet) exchanges data with a computer via either universal serial bus (USB) or Bluetooth protocol. When it comes to recharging, it is mostly achieved by using a power cable to connect to the power supply. This type of data transmission and recharging may bring inconvenience to the user. Thus, near field communication (NFC) and wireless charging are provided to improve user experience.

NFC is a short-distance, high frequency wireless communication technique. It allows electronic device to undergo non-contacting, point-to-point data transmission. Compared to Bluetooth, NFC does not require the complex matching procedure, and it is energy efficient and less likely to be interfered. In addition, wireless charging allows electronic device to be placed at any region as long as it is under the signal coverage of a charger, such that a power cable is not necessary anymore.

Conventional mobile phone or tablet requires an addition of antenna and chip so as to be compatible with NFC or wireless charging. For example, the back of certain mobile phone or tablet will be attached to NFC-compatible antenna and chip. Alternatively, the internal circuit board of the mobile phone or tablet will have additional antenna and chip to conduct NFC or wireless charging. In this regard, the manufacturing cost of this type of mobile phone or tablet is higher.

SUMMARY

An exemplary embodiment of the present disclosure provides a transmission interface device, and the transmission interface device comprises an antenna body. The antenna body comprises at least one electric coupling body and at least one magnetic coupling body at least covering or surrounding portion of the electric coupling body. When the antenna of the electronic device is close to the antenna body, the antenna body and with the antenna of the electronic device selectively generate an electric coupling effect, a magnetic coupling effect, or a strong electromagnetic coupling effect, such that the transmission interface device can wirelessly charge the electronic device, or alternatively the transmission interface device and the electronic device can perform a power or data transmission.

An exemplary embodiment of the present disclosure further provides a transmission interface system comprising the above transmission interface and an electronic device.

To sum up, the transmission interface device and system thereof provided by the exemplary embodiment of the present disclosure utilizes and adopts the magnetic coupling body and electric coupling body to make the antenna body and the antenna of the electronic device selectively generate the electric coupling effect, the magnetic coupling effect, or the strong electromagnetic coupling effect, such that the antenna of the electronic device can perform near field communication and receive the near field electric energy (i.e. wirelessly charged).

In order to further understand the techniques, means and effects of the present disclosure, the following detailed descriptions and appended drawings are hereby referred, such that, through which, the purposes, features and aspects of the present disclosure can be thoroughly and concretely appreciated.

BRIEF DESCRIPTION OF THE DRAWINGS

FIG. 1D is a schematic diagram of a transmission interface system provided by another exemplary embodiment of the present disclosure.

FIG. 3A through FIG. 3D are respectively a three-dimensional perspective, vertical view, lateral view, and front view diagrams of an antenna body of a transmission interface device provided by an exemplary embodiment of the present disclosure.

FIG. 6A through FIG. 6D are respectively a three-dimensional perspective, vertical view, lateral view, and front view diagrams of an antenna body of a transmission interface device provided by another exemplary embodiment of the present disclosure.

DETAILED DESCRIPTION OF THE EXEMPLARY EMBODIMENTS

Figure 1A:
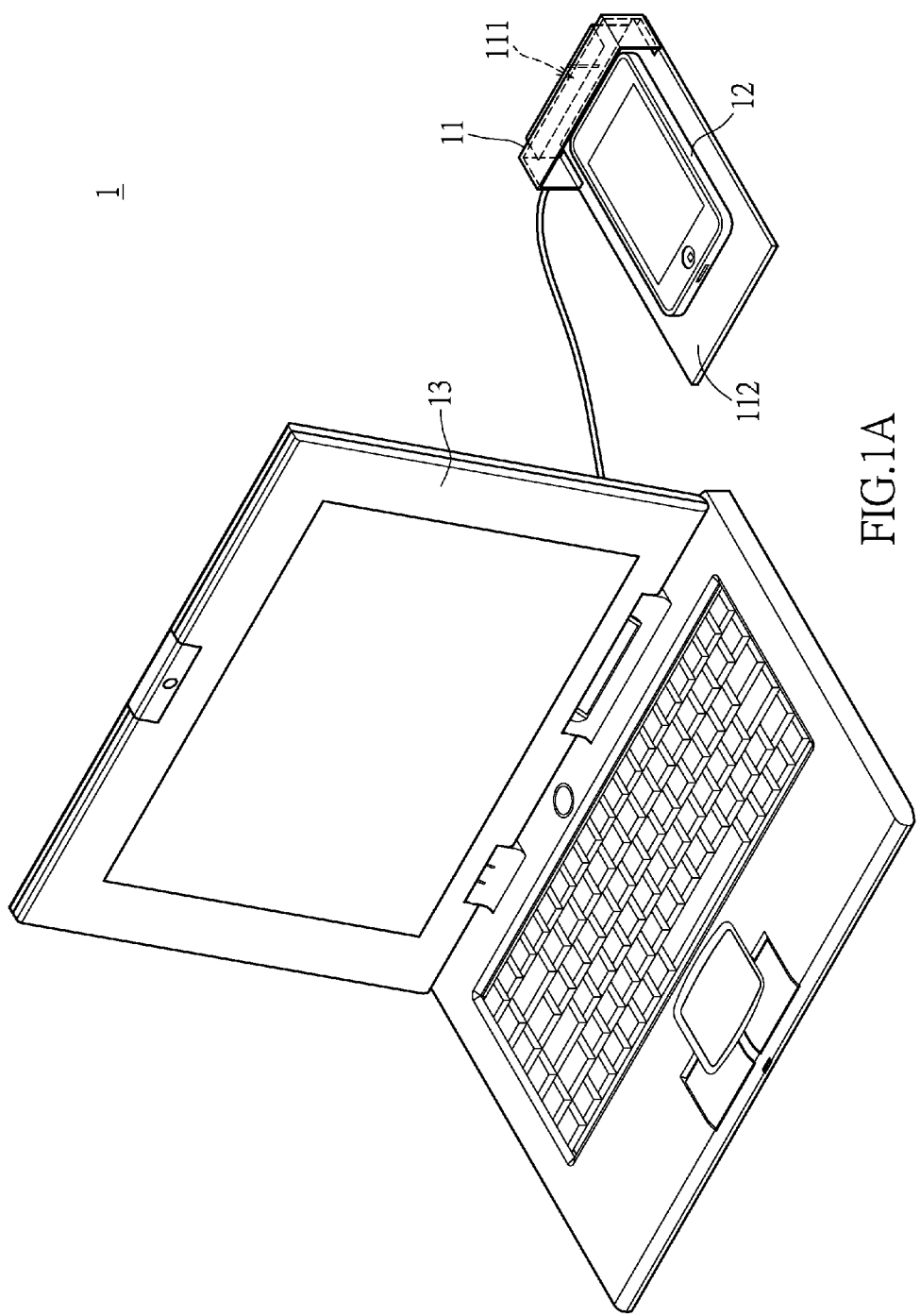
FIG. 1A is a schematic diagram showing a transmission interface system provided by an exemplary embodiment of the present disclosure.

An exemplary embodiment of the present disclosure provides a transmission interface device, which allows the electronic device and transmission interface to perform wireless data transmission (e.g. NFC) and wireless energy transmission (e.g. wireless charging) without additional antenna on the electronic device. The antenna body of the above transmission interface device and the antenna of the electronic device can selectively generate an electric coupling effect, a magnetic coupling effect, or a strong electromagnetic coupling effect. When the electronic device is close to the transmission interface device or placed at a specific location of the transmission interface device, the transmission interface device can perform NFC with the electronic device supporting the NFC function or wirelessly charge the electronic device with wireless charging module.

More specifically, since the antenna body of the transmission interface device with the antenna of the electronic device selectively generate the electric coupling effect, the magnetic coupling effect, or the strong electromagnetic coupling effect, the original S parameters of the antenna of the electronic device change. Thus, the transmission interface device can perform NFC with the electronic device or wirelessly charge the electronic device. In other words, the transmission interface device can perform the NFC with the electronic device, or wirelessly charge the electronic device only when the electronic device is close to the transmission interface device, or put at the specific location of the transmission interface device.

In another exemplary embodiment of the present disclosure, when the electronic device is close to the transmission interface device, or placed at the specific location of the transmission interface device, the far field communication function of the electronic device is disabled. For the electric coupling effect, the magnetic coupling effect, or the strong electromagnetic coupling effect, the transmission parameter $S_{21}$ (one of the S parameters) of the electronic device for the far field communication within a specific frequency band greatly decays. As a result, the far field communication function of the electronic device can be disabled. For the strong electromagnetic coupling effect, the transmission parameter $S_{21}$ of the electronic device for the far field communication within a specific frequency band decays slightly. As a result, the related chip for the far field communication of the electronic device can be disabled manually or by programming.

In another exemplary embodiment of the present disclosure, when the electronic device is close to the transmission interface device, or placed at the specific location of the transmission interface device, if the transmission parameter $S_{21}$ of the electronic device for the far field communication within a specific frequency band decays slightly under the presence of the electric coupling effect, the magnetic coupling effect, or the strong electromagnetic coupling effect, the far field communication function of the electronic device can be reserved. Meanwhile, the electronic device can perform NFC and far field communication via a protocol or a multiplexing manner (e.g. code, frequency, or time division multiplexing). Furthermore, if the transmission interface device is merely used to wirelessly charge the electronic device, the far field communication function of the electronic device cannot be disabled, and the multiplexing manner mentioned above is unnecessary.

It is noted that, the antenna body of the transmission interface device and the antenna of the electronic device selectively generate the electric coupling effect, the magnetic coupling effect, or the strong electromagnetic coupling effect according to characteristics of the antenna of the electronic device. Since the characteristics of the antenna of the electronic device is usually related to the model and the brand of the electronic device, it is preferred to use the software or firmware to control the transmission interface device and the antenna of the electronic device to selectively generate the electric coupling effect, the magnetic coupling effect, or the strong electromagnetic coupling effect according to the model and the brand of the electronic device. Furthermore, the above-mentioned software or firmware can be stored in the electronic device, the transmission interface device, or the computing device connected to the transmission interface device. In other words, the user can use the electronic device, the transmission interface device, or the computing device to control the transmission interface device and the antenna of the electronic device to selectively generate the electric coupling effect, the magnetic coupling effect, or the strong electromagnetic coupling effect according to the model and the brand of the electronic device.

Please refer to FIG. 1A. FIG. 1A is a schematic diagram showing a transmission interface system provided by an exemplary embodiment of the present disclosure. The transmission interface system 1 comprises a transmission interface device 11 and an electronic device 12. When the electronic device 12 is not close to the transmission interface device 11 and not placed at a specific location on the transmission interface device 11, the electronic device 12 cannot perform NFC with the transmission interface device 11, and the transmission interface device 11 cannot wirelessly charge the electronic device 12. However, when the electronic device 12 is close to the transmission interface device 11, or placed at the specific location on the transmission interface device 11 (e.g. the top portion of electronic device 12 is placed in the antenna body 111 of the transmission interface device 11 or close to the antenna body 111), the transmission interface device 11 can wirelessly charge the electronic device 12 or perform NFC with the electronic device 12.

More specifically, when the antenna of the electronic device 12 is close to the antenna body 111 of the transmission interface device 11, and the transmission interface device 11 transmits the power to the antenna body 111, the antenna body 111 and the antenna the electronic device 12 selectively generate the electric coupling effect, the magnetic coupling effect or the strong electromagnetic coupling effect, such that the S parameters ($S_{11}$, $S_{12}$, $S_{21}$, and $S_{11}$) of the antenna of the electronic device 12 change, and the antenna of the electronic device 12 can receive the electromagnetic wave within a specific frequency or band from the transmission interface device 11. For example, the antenna of the electronic device 12 operates in a first band while the antenna of the electronic device 12 is not close to the antenna body 111. However, when the antenna of the electronic device 12 is close to the antenna body 111 of the transmission interface device 11, and the transmission interface device 11 transmits the power to the antenna body 111, the antenna body 111 and the antenna of the electronic device 12 selectively generate the electric coupling effect, the magnetic coupling effect or the strong electromagnetic coupling effect, such that the antenna of the electronic device 12 can operate in a second band. It should be noted that the first band is not equal to the first band.

In the exemplary embodiment of FIG. 1, the transmission interface device 11 has a chip (not shown in the figure), the antenna body 111, and the grounding unit 112. The antenna body 111 is electrically connected to the chip. When the electronic device 12 and the transmission interface device 11 selectively generate the electric coupling effect, the magnetic coupling effect or the strong electromagnetic coupling effect, the chip can receive the data from the electronic device 12, and the data to be sent to the electronic device 12 (e.g. the data from the computing device 13 to the electronic device 12) can be transmitted to the electronic device 12 via NFC. Furthermore, if the data transmission is not required, the transmission interface device 11 can have the antenna body 111 and the grounding unit 112 alone. The antenna body 111 transmits the power to the electronic device 12 so as to perform the wireless charging.

The antenna body 111 can, for example, have at least one electric coupling body and at least one magnetic coupling body, wherein the magnetic coupling body at least covers or surrounds a portion of the electric coupling body, and the electric coupling body and the magnetic coupling body are electrically connected to the grounding unit 112. The electric coupling body and the antenna of the electronic device 12 are used to generate the electric coupling effect, and the magnetic coupling body and the antenna of the electronic device 12 are used to generate the magnetic coupling effect. Along with the functions of the electric coupling body and the magnetic coupling body, the antenna of the electronic device 12 and the antenna body 111 selectively generate the electric coupling effect, the magnetic coupling effect, or the strong electromagnetic coupling effect, so as to change the S parameters of the antenna of the electronic device 12.

In the exemplary embodiment of the present disclosure, the transmission interface device 11 can transmit the received electric energy to the electric coupling body and the magnetic coupling body, and thus the antenna of the electronic device 12 and the antenna body 111 can generate the strong electromagnetic coupling effect. Alternatively, the transmission interface device 11 can transmit the received power to the electric coupling body or the magnetic coupling body, and thus the antenna of the electronic device 12 and the antenna body 111 can generate the electric coupling effect or the magnetic coupling effect.

In the exemplary embodiment of the present disclosure, the grounding unit 112 can be, for example, an independent metal grounding plane or a grounding plane of a print circuit board. It should be noted that the grounding unit 112 in the exemplary embodiment of the present disclosure is optional. For example, the electric coupling body is plate dipole antenna, and thus the grounding unit 12 can be removed. Furthermore, the number of the antenna body 111 is not limited to the present embodiment. In another exemplary embodiment, the antenna body 111 can be a single electromagnetic coupling body which can independently and selectively generate the electric coupling effect, the magnetic coupling effect, or the strong electromagnetic coupling effect with the antenna of the electronic device 12. In short, the implementations of the antenna body 111 and the grounding unit 112 are not used to limit the present disclosure.

In the exemplary embodiment of the present disclosure, the transmission interface system 1 can further comprise a computing device 13, and the computing device 13 can link to the transmission interface device 11 by a wireless or wired manner. However, the presence of the computing device 13 and the manner of how the computing device 13 links to the transmission interface device 11 are not used to limit the present disclosure.

It should be noted that the antenna body 111 of the transmission interface device 11 and the antenna of the electronic device 12 selectively generate the electric coupling effect, the magnetic coupling effect, or the strong electromagnetic coupling effect according to the characteristics of the antenna of the electronic device 12. For example, since the characteristics of the antenna of the electronic device 12 are usually related to the model and the brand of the electronic device 12, the user can use the electronic device 12, the transmission interface device 11, or the computing device 13 to control the transmission interface device 11 and the antenna of the electronic device 12 to selectively generate the electric coupling effect, the magnetic coupling effect, or the strong electromagnetic coupling effect according to the model and the brand of the electronic device 12.

In addition, in another exemplary embodiment of the present disclosure, the transmission interface device 11 can be further integrated into the computing device 13, or alternatively, the transmission interface device 11 can be integrated into the other equipment or device. For example, the transmission interface device 11 can be integrated into an automobile communication interface, a desk, a portable power supply, an appliance, or a computing device. The transmission interface device 11 in the exemplary embodiment can be an assembly shaped like a box with a plate, and in other exemplary embodiment the transmission interface device 11 may be configured as a box, a plate, or any other geometric configuration.

Moreover, the electronic device 12 in the exemplary embodiment can be a cell phone, and in the other exemplary embodiment it may be a tablet, an automobile electronic device or a portable storage device. The electronic device 12 may even be integrated into other equipment or device, such as a vehicle or an appliance. In short, the present disclosure does not limit the applications of the transmission interface system 1, the transmission interface device 11, and the electronic device 12.

Figure 1B:
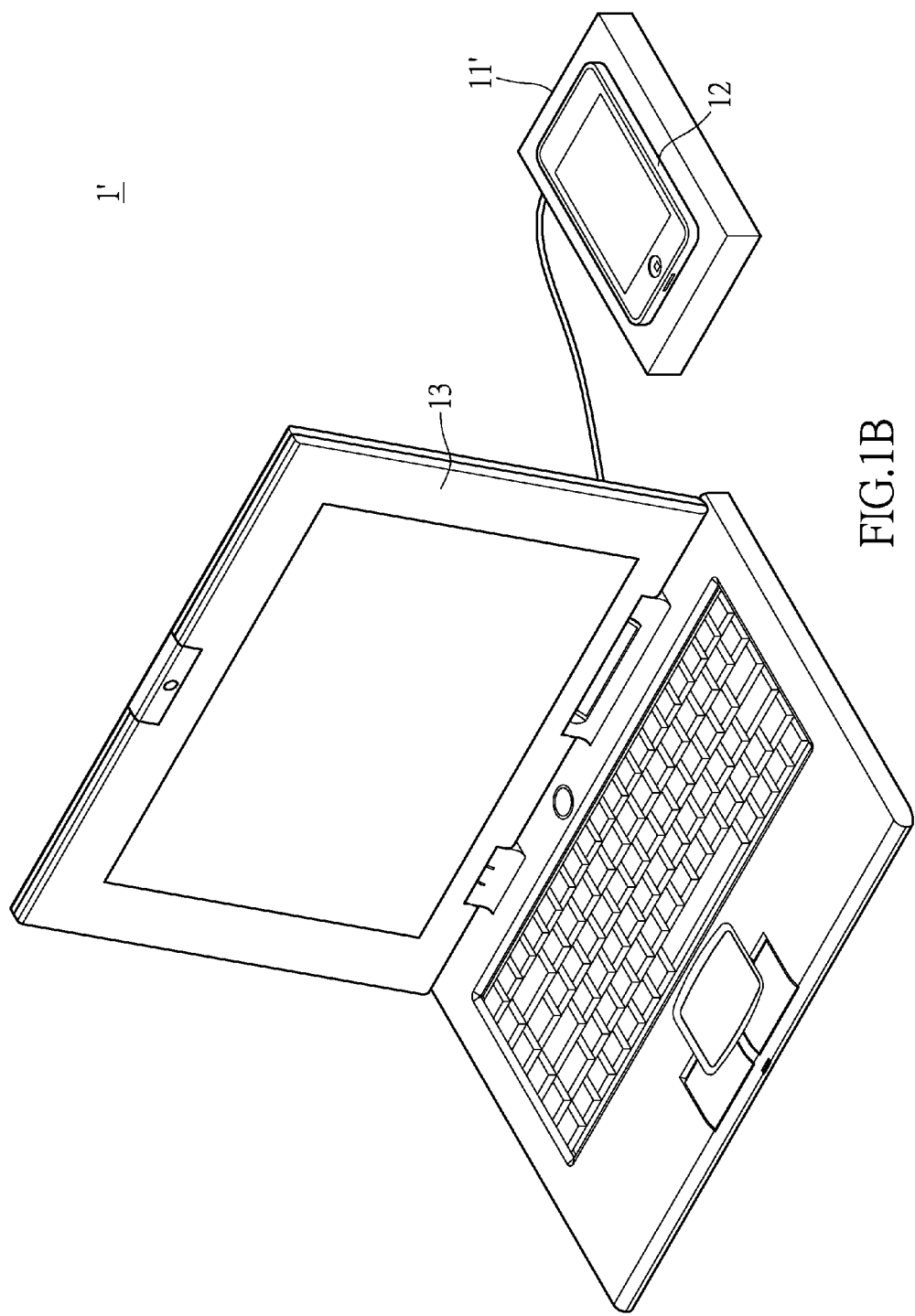
FIG. 1B is a schematic diagram showing a transmission interface system provided by another exemplary embodiment of the present disclosure.
Figure 1C:
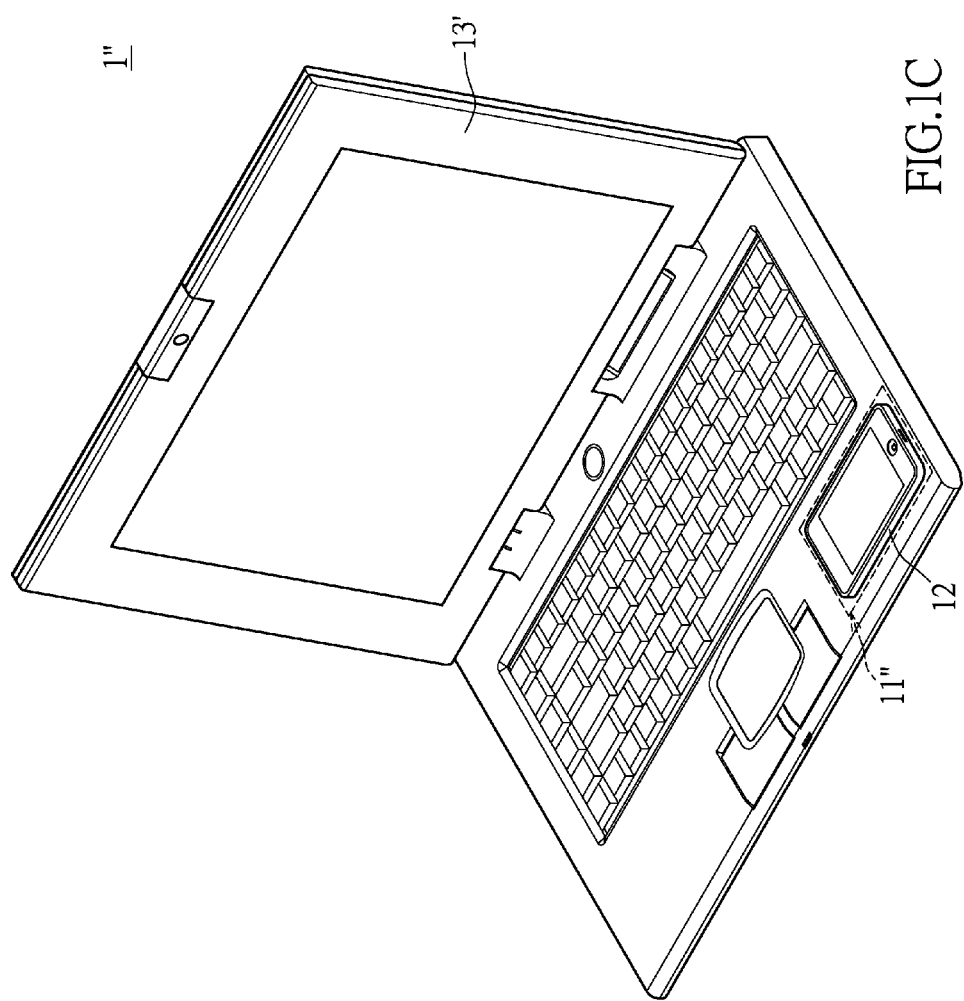
FIG. 1C is a schematic diagram of a transmission interface system provided by another exemplary embodiment of the present disclosure.

Please refer to FIG. 1B through FIG. 1D. FIG. 1B through FIG. 1D are schematic diagrams showing transmission interface systems provided by other exemplary embodiments of the present disclosure. In FIG. 1B, the transmission interface device 11' is configured to a box, and when the electronic device 12 is disposed on the surface of the transmission interface device 11', the antenna body of the transmission interface device 11' and the antenna of the electronic device 12 selectively generate the electric coupling effect, the magnetic coupling effect, or the strong electromagnetic coupling effect. In FIG. 1C, the transmission interface device 11" is integrated into the computing device 13'. In FIG. 1D, the transmission interface device 11''' is a desktop standing charger and serving as an interface. When the electronic device 12 is plugged in the transmission interface device 11''', the antenna body of the transmission interface device 11''' and the antenna of the electronic device 12 selectively generate the electric coupling effect, the magnetic coupling effect, or the strong electromagnetic coupling effect.

Figure 1E:
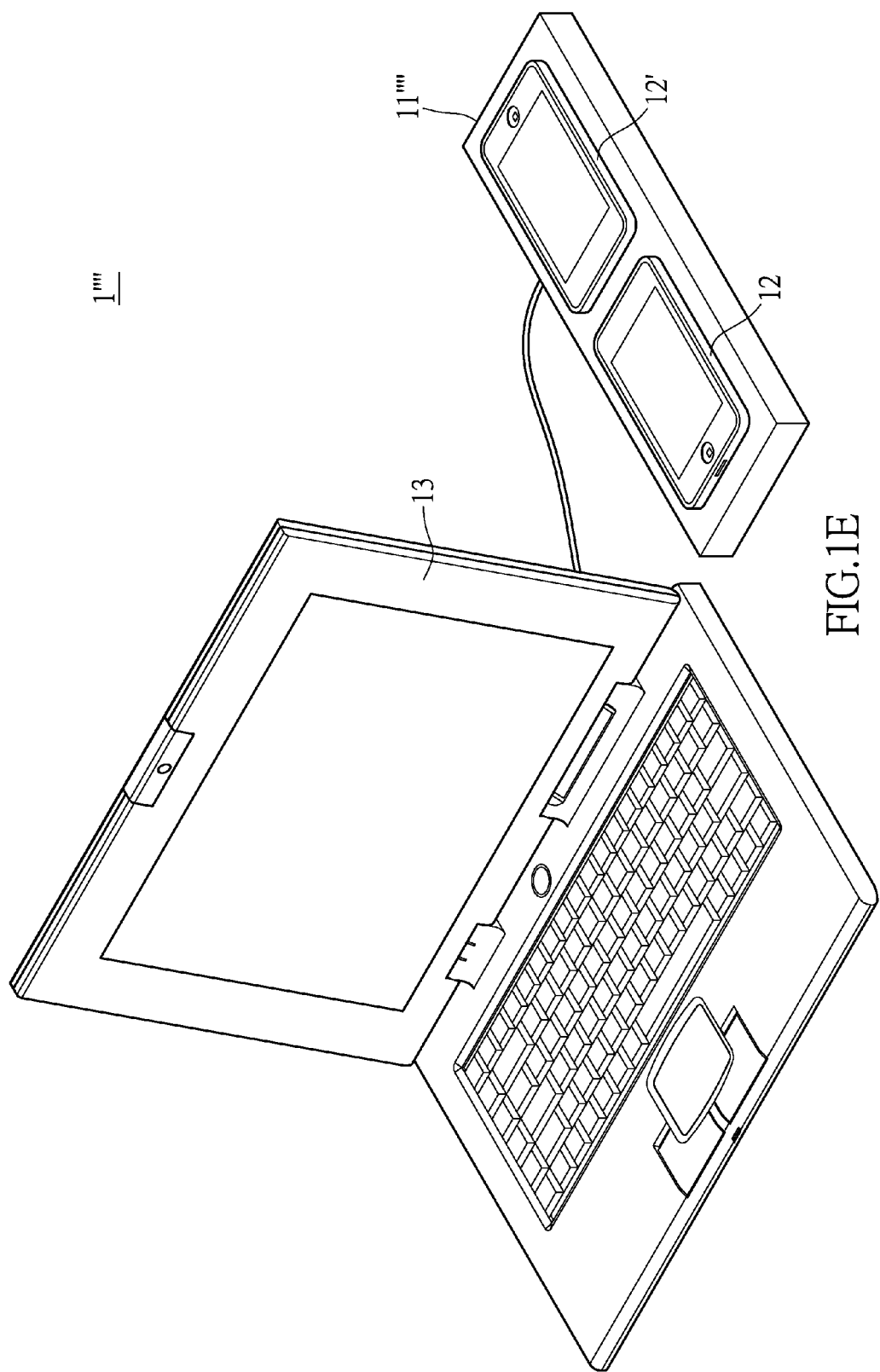
FIG. 1E is a schematic diagram of a transmission interface system provided by another exemplary embodiment of the present disclosure.

Please refer to FIG. 1E. FIG. 1E is a schematic diagram of a transmission interface system provided in accordance with another exemplary embodiment of the present disclosure. In FIG. 1E, the transmission interface device 11'''' resembles a box, when electronic devices 12 and 12' are disposed on the surface of the transmission interface device 11'''', the antenna body of the transmission interface device 11'''' selectively generates the electric coupling effect, the magnetic coupling effect, or the strong electromagnetic coupling effect with the antenna of the electronic devices 12 and 12'. The transmission interface device 11'''' can simultaneously transmit the data and power to the electronic devices 12 and 12'. Alternatively, the data and the power of the electronic device 12 can be transmitted to the electronic device 12' through the transmission interface device 11''''. That is, the transmission interface device 11'''' in the exemplary embodiment may act as a relay of the electronic devices 12 and 12'. Moreover, in the exemplary embodiment, the computing device 13 may be removed, and the transmission interface device 11'''' may have a power supply itself.

Figure 2:
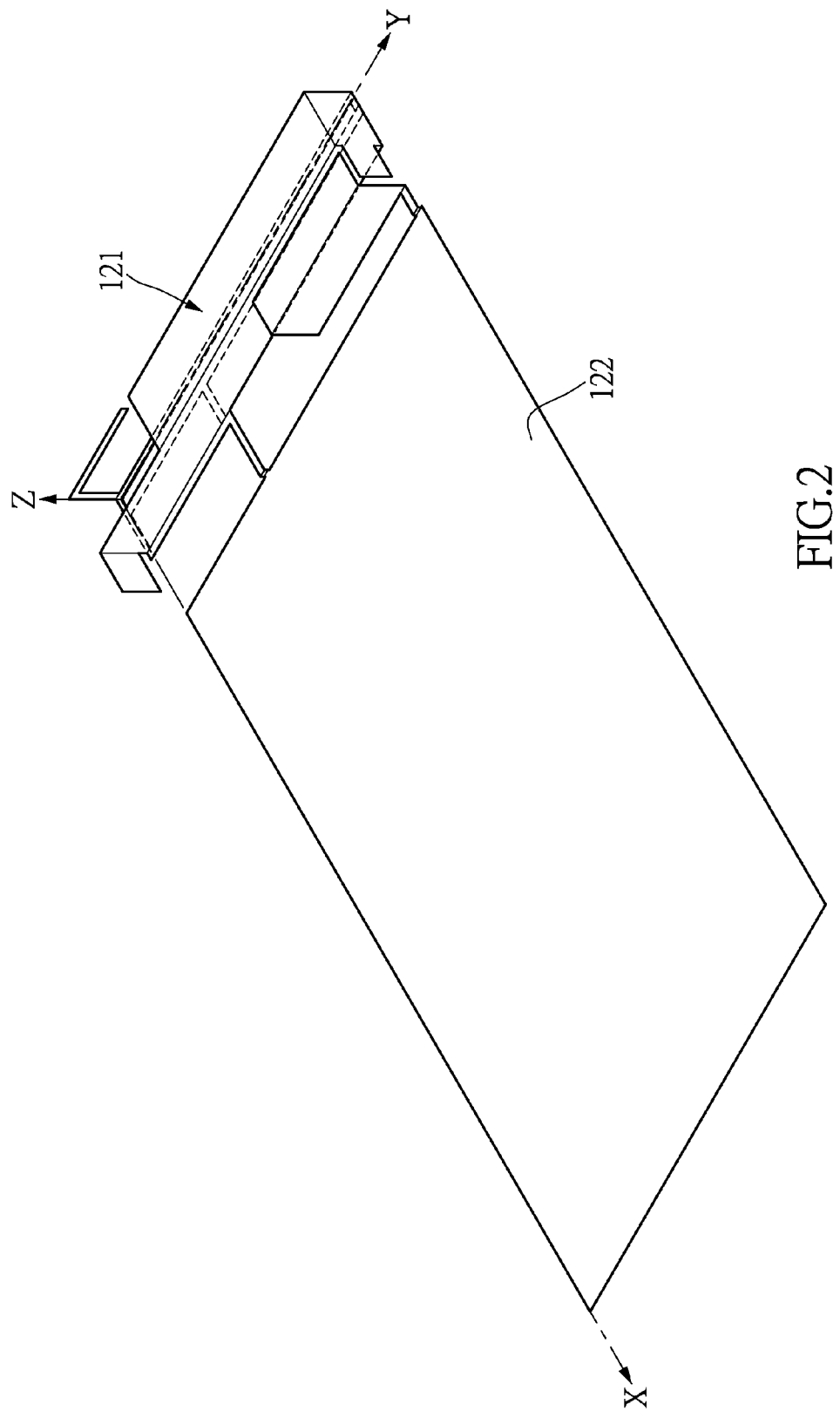
FIG. 2 is a three-dimensional perspective diagram of an electronic device provided by an exemplary embodiment of the present disclosure.
Figure 3A:
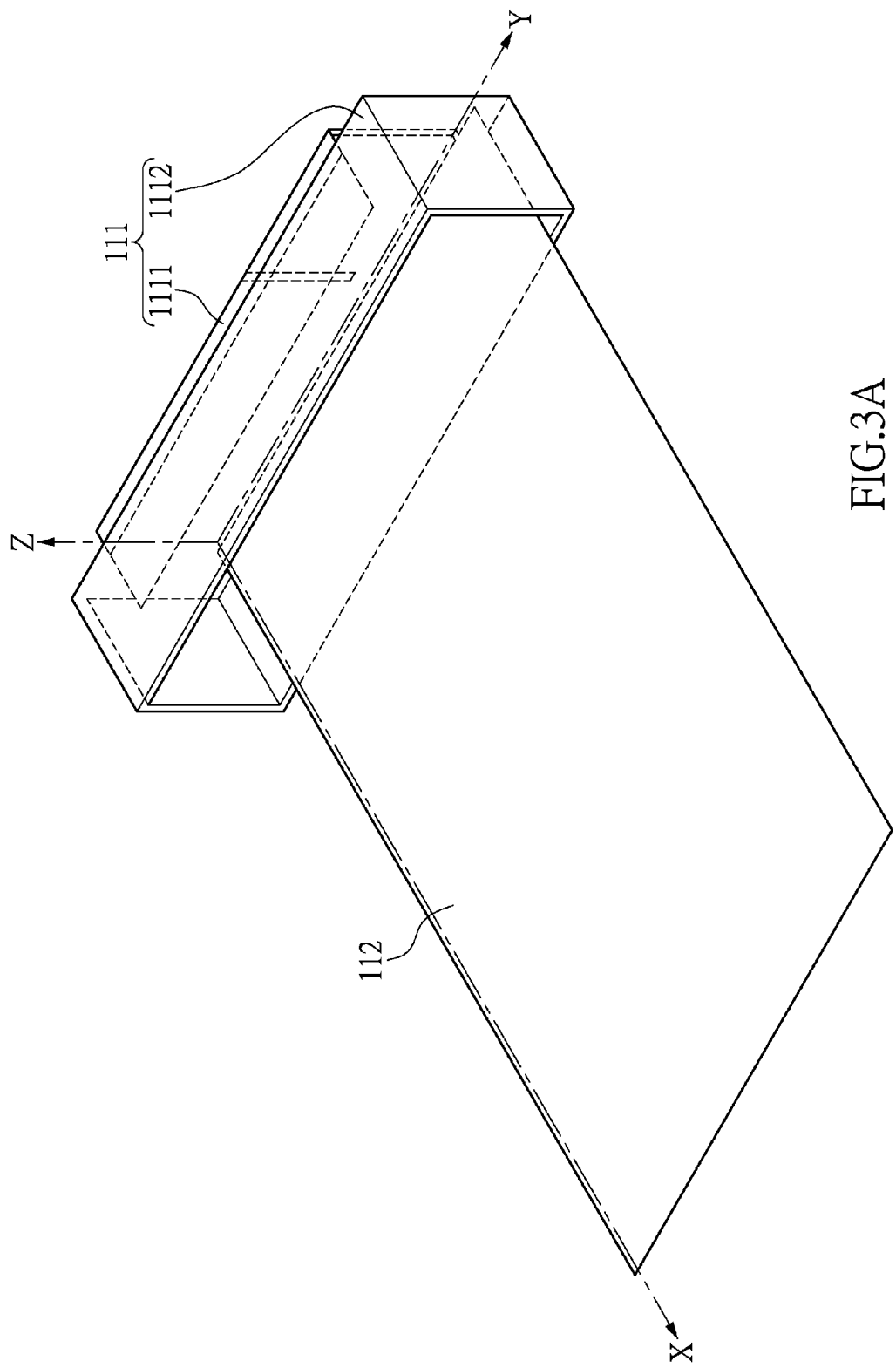

Please referring to FIG. 2. FIG. 2 is a perspective diagram of an electronic device provided in accordance with an exemplary embodiment of the present disclosure. The antenna 121 of the electronic device is electrically connected to the grounding unit 122 of the electronic device, wherein the antenna 121 in the exemplary embodiment is a three-dimensional antenna, and the grounding unit 122 can be independent metal grounding plane or a grounding plane of a print circuit board of the electronic device. The reflection parameter $S_{11}$ of the antenna 121 is less than −10 dB within the first band, wherein the first band is the band for the far field communication.

Please refer to FIG. 3A through FIG. 3D. FIG. 3A through FIG. 3D are vertical view, lateral view, and front view respectively of an antenna body of a transmission interface device provided in accordance with an exemplary embodiment of the present disclosure. The antenna body 111 is electrically connected to the grounding unit 112, and the antenna body 111 comprises an electric coupling body 1111 and a magnetic coupling body 1112. The magnetic coupling body 1112 is a loop magnetic coupling body which surrounds the electric coupling body 1111. The electric coupling body 1111 electrically connected to the grounding unit 1112 is a planar inverted-F antenna which has a signal feeding end A and a grounding end B, wherein the signal feeding end A is used to receive a feeding signal (for example through the inner conductor of the coaxial cable), and the grounding end B is grounded (for example through the outer conductor of the coaxial cable).

Figure 4:
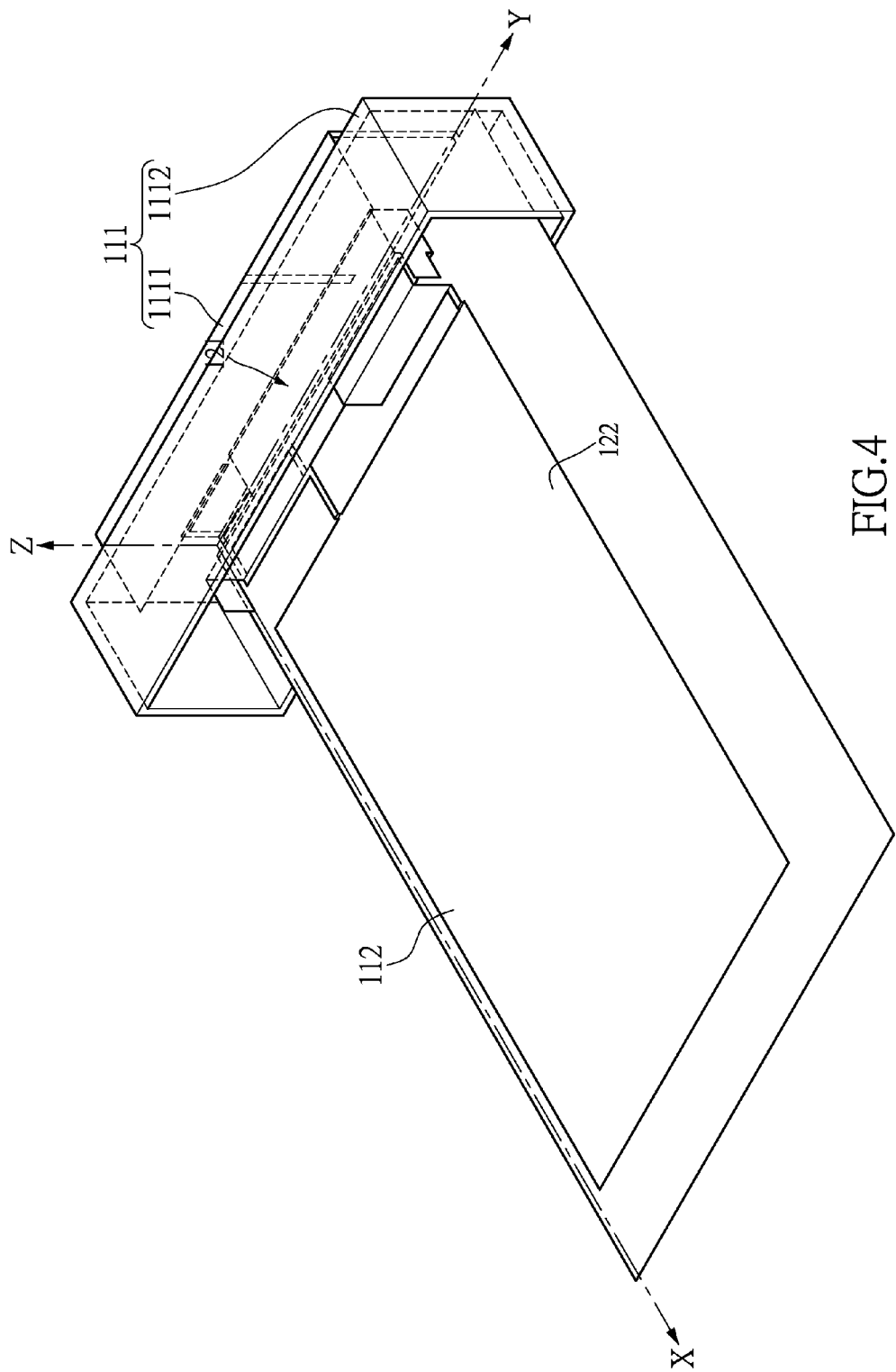
FIG. 4 is a three-dimensional perspective diagram of an antenna body of a transmission interface device provided by an exemplary embodiment of the present disclosure when the electronic device is close to the transmission interface device.

Please refer to FIG. 4. FIG. 4 is a perspective diagram of an antenna body of a transmission interface device provided in accordance with an exemplary embodiment of the present disclosure when the electronic device is close to the transmission interface device. When the antenna 121 of the electronic device is close to the antenna body 111 of the transmission interface device, the reflection parameter $S_{11}$ of the antenna 121 is less than −10 dB within the second band rather than the first band, wherein the first band is not equal to the second band, and the first band and the second band are not overlapped. In addition, the transmission parameter $S_{21}$ of the antenna 121 of the electronic device has a maximum value within the second band, and the reflection parameter $S_{22}$ of the antenna 121 of electronic device is less than −10 dB within the second band. Therefore, the transmission interface device can use the second band to wirelessly charge the electronic device or perform NFC with the electronic device.

Figure 5:
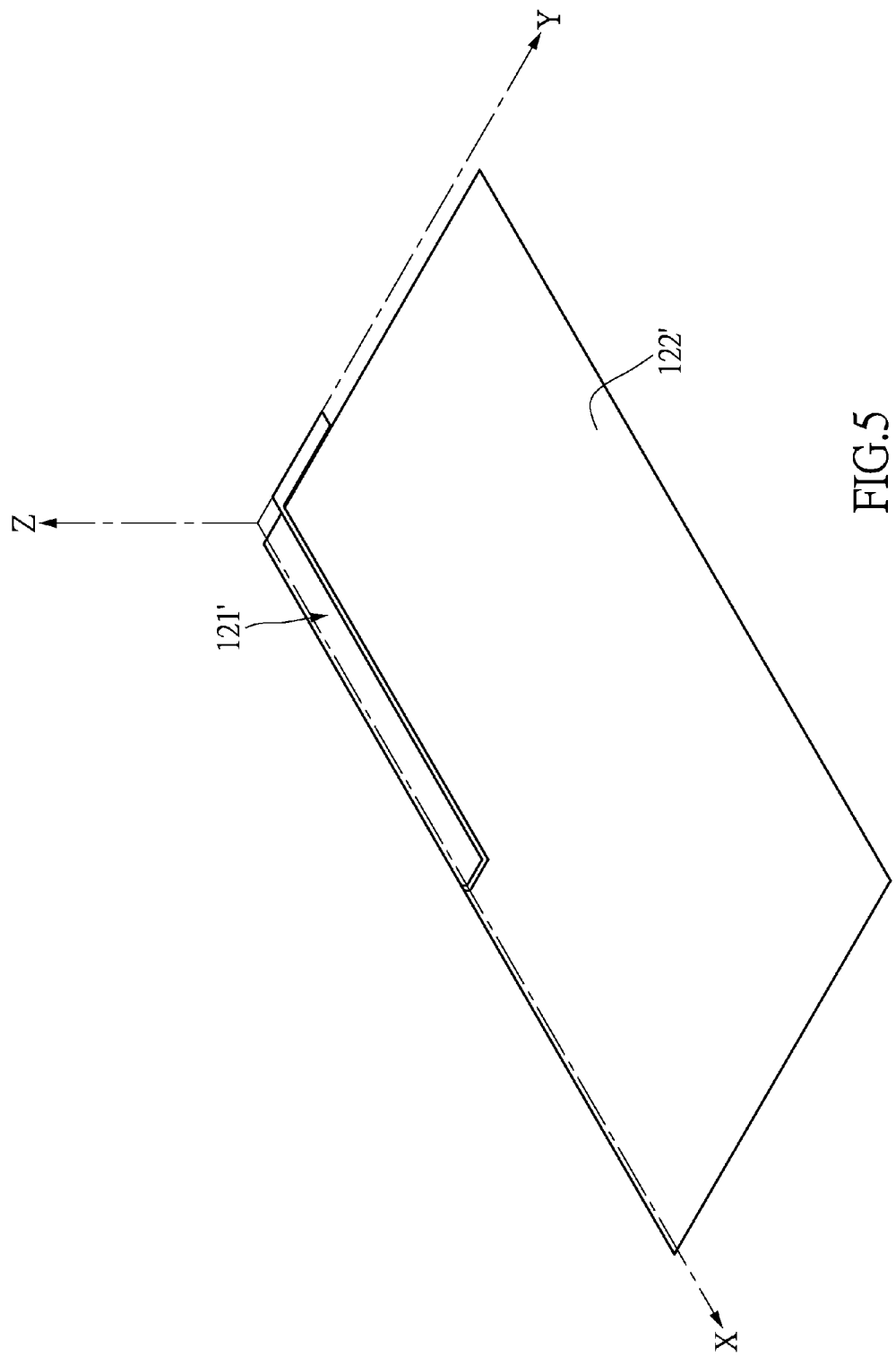
FIG. 5 is a three-dimensional perspective diagram of an electronic device provided by another exemplary embodiment of the present disclosure.
Figure 6A:
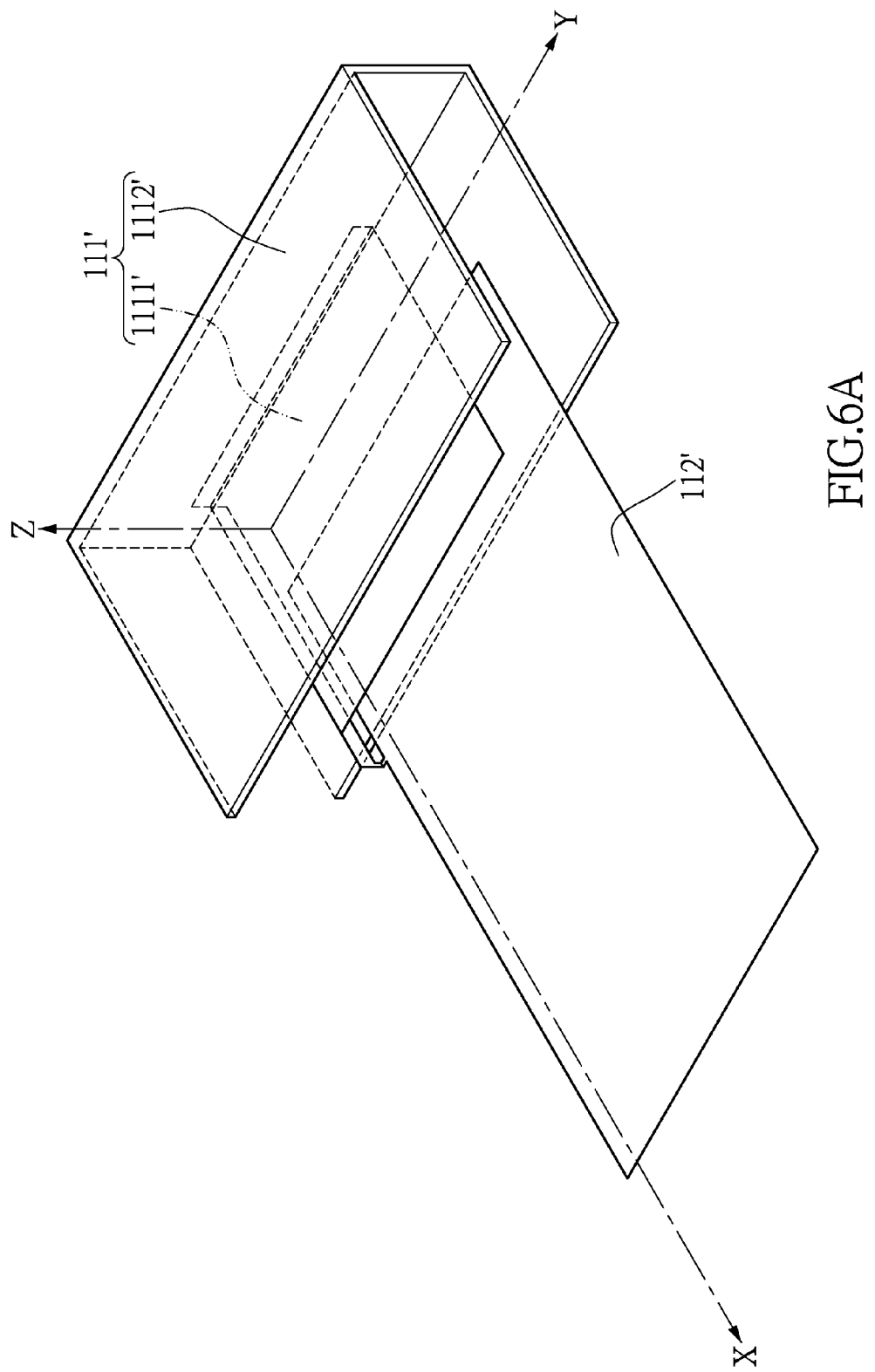

Please refer to FIG. 5. FIG. 5 is a perspective diagram of an electronic device provided in accordance with another exemplary embodiment of the present disclosure. In FIG. 5, the antenna 121' of the electronic device is also electrically connected to the grounding unit 122' of the electronic device, but compared to the exemplary embodiment of FIG. 2, the antenna 121' is a plate antenna. Moreover, the reflection parameter $S_{11}$ of the antenna 121' is less than −10 dB within a third band, and the third band is a band for the far field communication. In addition, the antenna 121' in FIG. 5 is a broadband antenna.

Please refer to FIG. 6A through FIG. 6D. FIG. 6A through FIG. 6D are vertical view, lateral view, and front view respectively of an antenna body of a transmission interface device provided in accordance with another exemplary embodiment of the present disclosure. In FIG. 6A through FIG. 6D, the antenna body 111' is also electrically connected to the grounding unit 112', but compared to the exemplary embodiment of FIG. 3A through FIG. 3D, the magnetic coupling body 1112 of the antenna body 111' is a U-shaped magnetic coupling body, and at least covers or surrounds the portion of the electric coupling body 1111'. In addition, the electric coupling body 1111' is a planar inverted-F antenna with a different shape from that in FIG. 3A through FIG. 3D.

Figure 7:
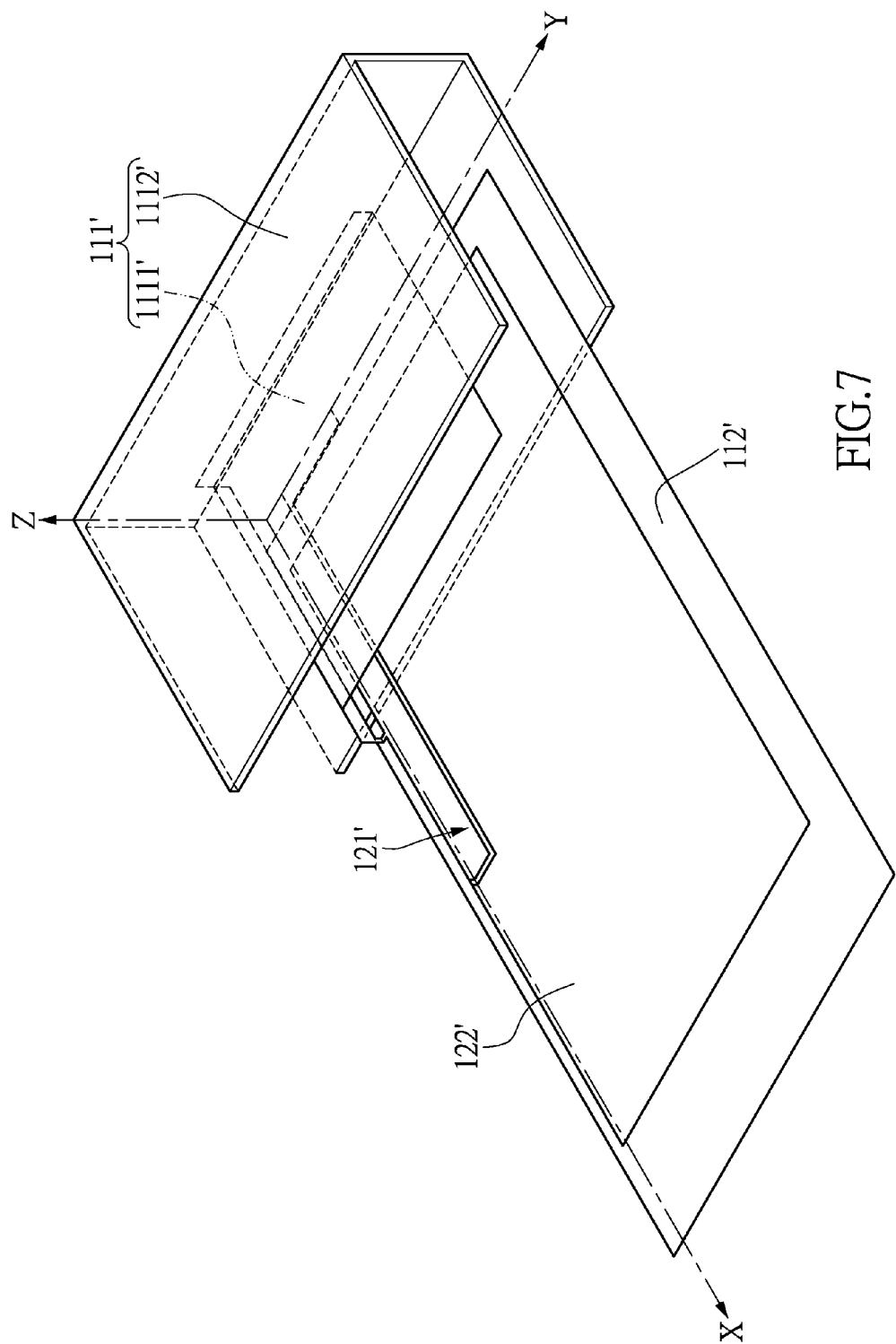
FIG. 7 is a three-dimensional perspective diagram of an antenna body of a transmission interface device provided by another exemplary embodiment of the present disclosure when the electronic device is close to the transmission interface device.

Please refer to FIG. 7. FIG. 7 is a perspective diagram of an antenna body of a transmission interface device provided in accordance with another exemplary embodiment of the present disclosure when the electronic device is close to the transmission interface device. When the antenna 121' of the electronic device is close to the antenna body 111' of the transmission interface device, the reflection parameter $S_{11}$ of the antenna 12' of the electronic device is less than −10 dB within the fourth band rather than the third band, wherein the fourth band is within the third band. In addition, the transmission parameter $S_{21}$ of the electronic device has the maximum value within the fourth band, and the reflection parameter $S_{22}$ of the antenna 121 of the electronic device is less than −10 dB within the fourth band. Thus, the transmission interface device can use the fourth band to wirelessly charge the electronic device or perform NFC with the electronic device.

It should be noted that, since the electronic device performs the far field communication within the third band, and the fourth band is within the third band, the electronic device in the exemplary embodiment can use the protocol or the multiplexing manner to perform the far field communication and the NFC when the antenna 121' of the electronic device is close to the antenna body 111' of the transmission interface device. Furthermore, in the exemplary embodiment, the electronic device may disable the chip related to the far field communication to prevent the far field communication from affecting NFC. Moreover, if the transmission interface device is merely used to wireless charge the electronic device, the multiplexing manner for the far field communication and NFC cannot be enabled, and the action for disabling the chip related to the far field communication cannot be needed, either.

Figure 8:
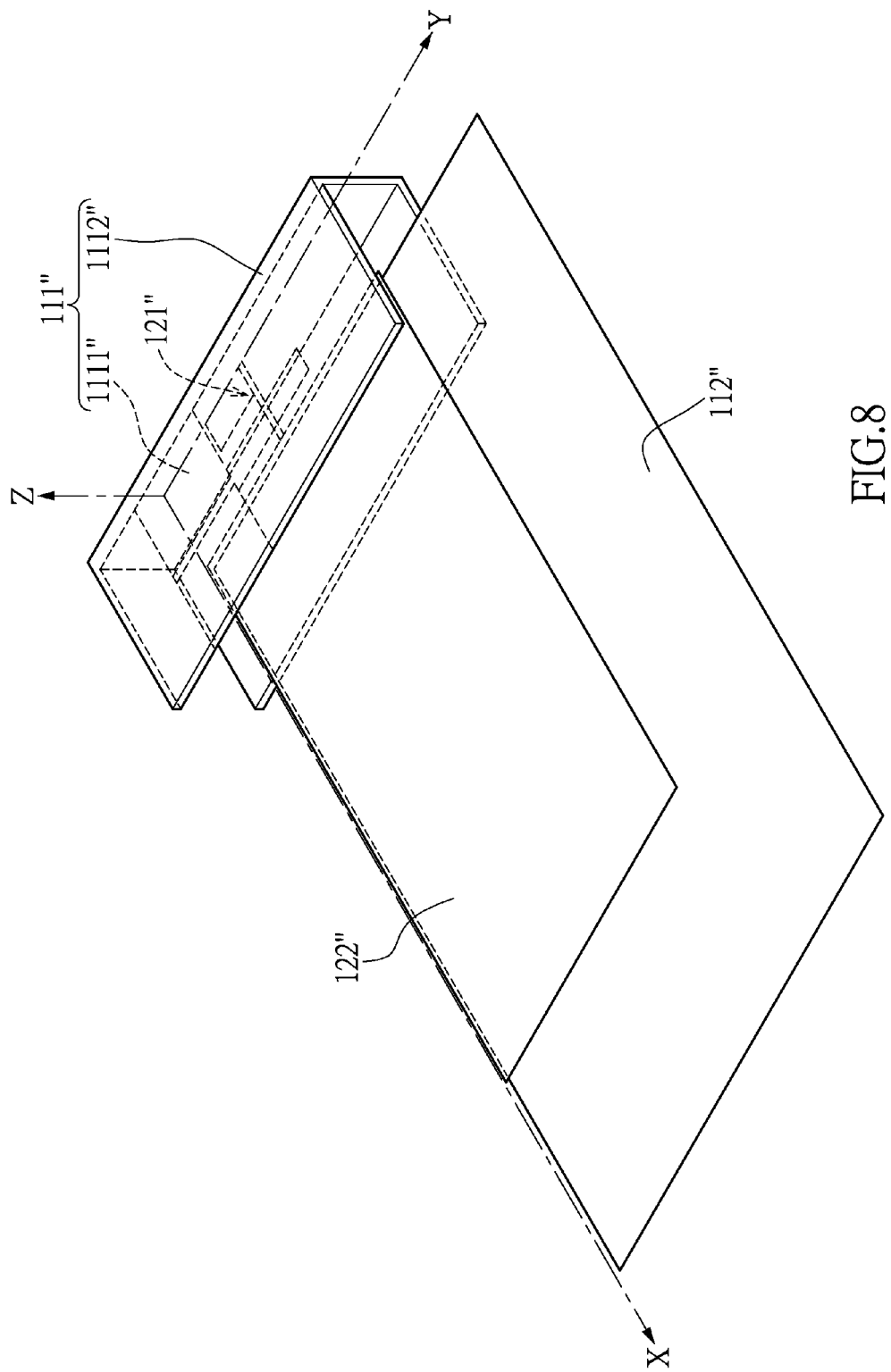
FIG. 8 is a three-dimensional perspective diagram of an antenna body of a transmission interface device provided by another exemplary embodiment of the present disclosure when the electronic device is close to the transmission interface device.

Please refer to FIG. 8. FIG. 8 is a perspective diagram of an antenna body of a transmission interface device provided in accordance with another exemplary embodiment of the present disclosure when the electronic device is close to the transmission interface device. In the exemplary embodiment, the antenna 121'' of the electronic device and the antenna body 111'' of the transmission interface device are also electrically connected to the grounding units 122'' and 112'' respectively, and the magnetic coupling body 1112'' of the antenna body 111' is also the U-shaped magnetic coupling body, but compared to the exemplary embodiment of FIG. 6A, the antenna 121'' is a plate antenna, and the electric coupling body 1111'' of the antenna body 111' is the plate dipole antenna. The grounding unit 112'' in the exemplary embodiment can be removed as mentioned above.

Figure 9:
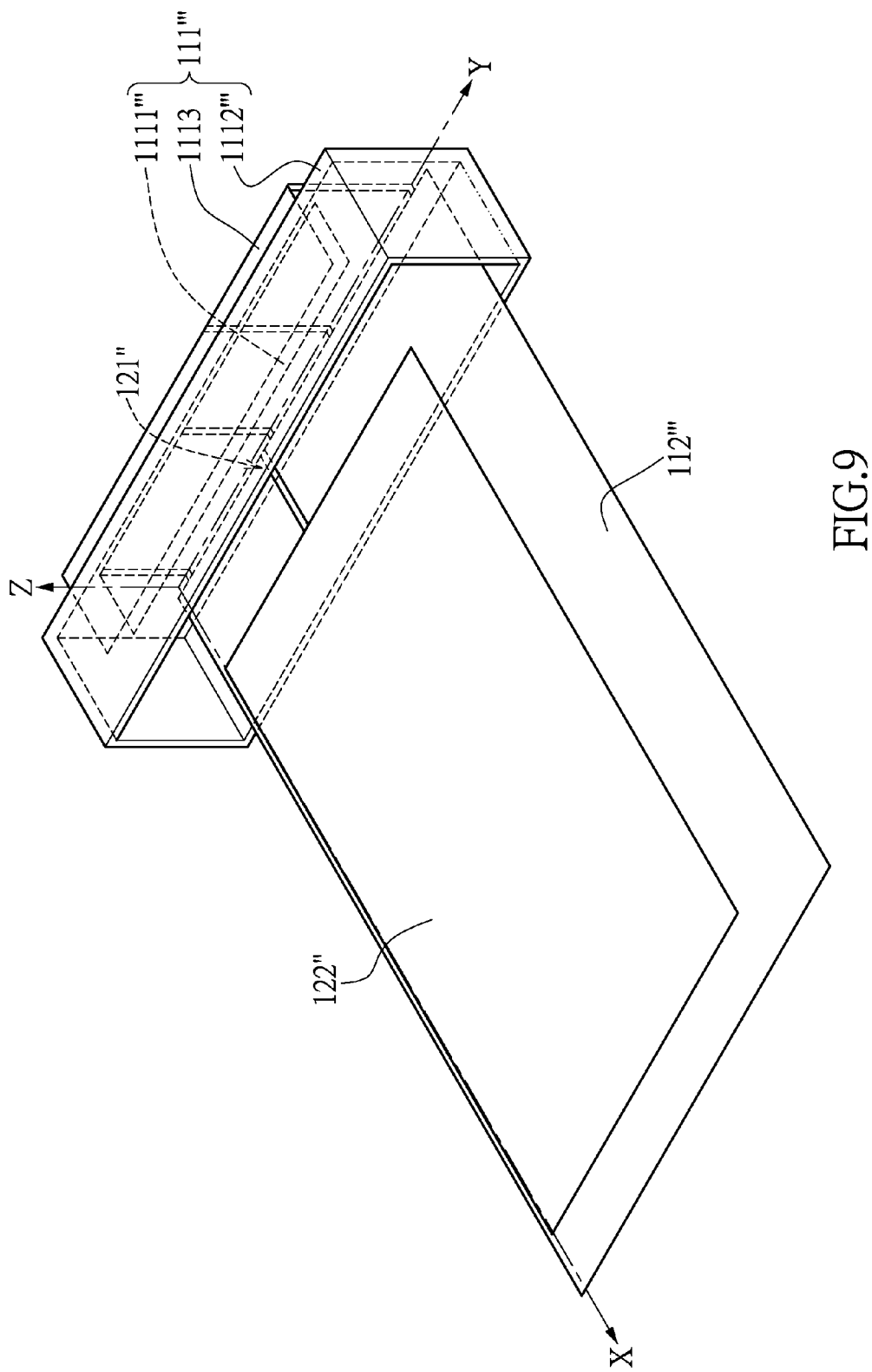
FIG. 9 is a three-dimensional perspective diagram of an antenna body of a transmission interface device provided by another exemplary embodiment of the present disclosure when the electronic device is close to the transmission interface device.

Please refer to FIG. 9. FIG. 9 is a perspective diagram of an antenna body of a transmission interface device provided in accordance with another exemplary embodiment of the present disclosure when the electronic device is close to the transmission interface device. In the exemplary embodiment, the antenna 121" of the electronic device and the antenna body 111" of the transmission interface device are also electrically connected to the grounding units 122" and 112" respectively, and the magnetic coupling body 1112" of the antenna body 111" is also the U-shaped magnetic coupling body, but compared to the exemplary embodiment of FIG. 9A, the antenna 121" is a plate antenna, and the antenna body 111" has two electric coupling bodies 1111" and 1113".

From the above exemplary embodiments, it is known that the contour of the antenna body of the transmission interface device is not used to limit the present disclosure. Furthermore, although the transmission interface device in the above exemplary embodiment has a relatively large grounding unit, thus an assembly of a box and a plate, the present disclosure is not limited thereto. The length and width of the grounding unit of the transmission interface device may be respectively similar to those of the antenna body, such that the transmission interface device can be an assembly of a box shape alone. In another exemplary embodiment, the transmission interface device can be an assembly of a plate shape, and thus it is easy to be integrated into a working table. In short, the instant embodiment does not limit the implementation of the antenna body of the transmission interface device. That is, the other design which makes the antenna of the electronic device and the antenna body selectively generate the electric coupling effect, the magnetic coupling effect, or the strong electromagnetic coupling effect falls in the concept of the above exemplary embodiment.

Figure 10:
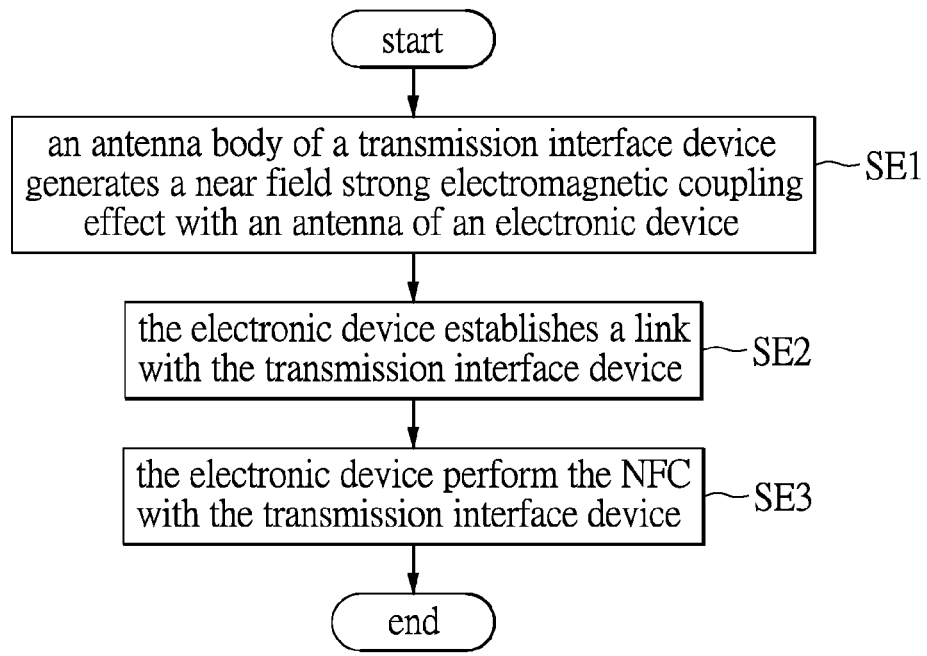
FIG. 10 is a flow chart of a near field transmission method provided by an exemplary embodiment of the present disclosure.

Please refer to FIG. 10. FIG. 10 is a flow chart of a near field transmission method provided by an exemplary embodiment of the present disclosure. The near field transmission method in FIG. 10 is executed in the transmission interface device and the electronic device of the transmission interface system and makes the transmission interface device and the electronic device perform the data transmission. Firstly, at Step SE1, when the antenna of the electronic device is close to the antenna body of the transmission interface device, the antenna of the electronic device and the antenna body of the transmission interface device selectively generate the electric coupling effect, the magnetic coupling effect, or the strong electromagnetic coupling effect. Next, at Step SE2, via a protocol, the electronic device and the transmission interface device establish a link. Then, after the link is established, at Step SE3, the electronic device and the transmission interface device undergo NFC to exchange the data.

Figure 11:
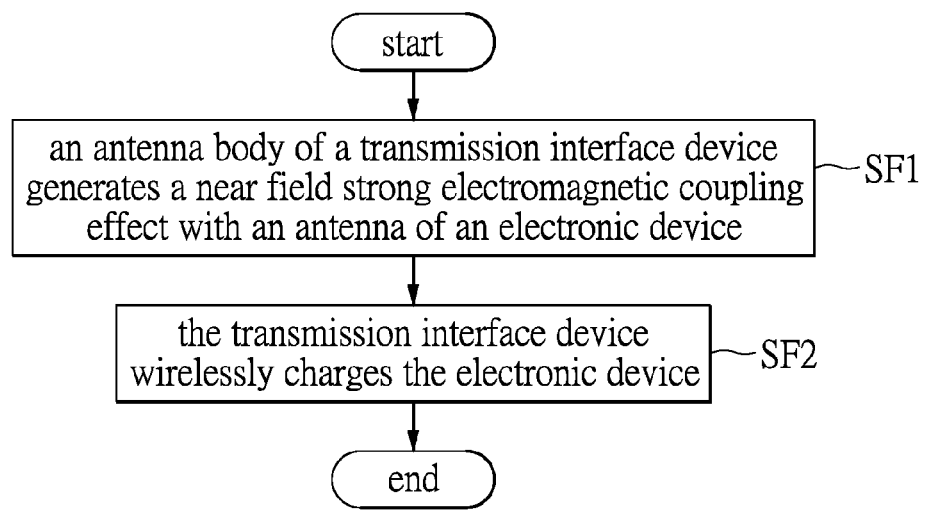
FIG. 11 is a flow chart of a near field transmission method provided by another exemplary embodiment of the present disclosure.

Please refer to FIG. 11. FIG. 11 is a flow chart of a near field transmission method provided by another exemplary embodiment of the present disclosure. The near field transmission method in FIG. 11 is executed in the transmission interface device and the electronic device of the transmission interface system, and makes the transmission interface device transmit the electric energy to the electronic device, so as to perform the wireless charging. Firstly, Step SF1 is executed. Step SF1 is identical to Step SE1, thus the description not repeated to avoid redundancy. Next, since the objective is for the wireless charging, the linking establishment procedure is not required. At step SF2, the transmission interface device performs a near field electric energy transmission to the electronic device, such that the transmission interface device can wirelessly charge the electronic device.

To sum up, the transmission interface device and system thereof provided by exemplary embodiment of the present disclosure use the magnetic coupling body and the electric coupling body to make the antenna body generate the electric coupling effect, the magnetic coupling effect, or the strong electromagnetic coupling effect with the antenna of the electronic device, such that the antenna of the electronic device can perform NFC or receive the near field electric energy (i.e. to be wirelessly charged). Thus, unlike conventional NFC or wireless charging technique, the electronic device does not need additional antenna and/or chip in the electronic device for the transmission interface system. Accordingly, the transmission interface device and system provided by the exemplary embodiments of the present disclosure can reduce the manufacturing cost of the electronic device. Moreover, by using the transmission interface device of the exemplary embodiment of the present disclosure, the software or firmware of the current electronic device can be modified to make the existing electronic device perform NFC.

The descriptions illustrated supra set forth simply the preferred embodiments of the present disclosure; however, the characteristics of the present disclosure are by no means restricted thereto. All changes, alternations, or modifications conveniently considered by those skilled in the art are deemed to be encompassed within the scope of the present disclosure delineated by the following claims.

What is claimed is:

1. A transmission interface device, applied for wirelessly charging or performing a near-field communication with an electronic device, comprising:
   an antenna body, comprising:
   at least one electric coupling body, generating an electric coupling effect with the electronic device;
   at least one magnetic coupling body independent to the electric coupling body, covering or surrounding at least a portion of the electric coupling body, and generating a magnetic coupling effect with the electronic device;
   wherein when an antenna of the electronic device is close to the antenna body, the antenna body and the antenna of the electronic device selectively generate the electric coupling effect, the magnetic coupling effect, or a strong electromagnetic coupling effect, so as to change at least one matching condition for the antenna body and the antenna of the electronic device, such that the transmission interface device wirelessly charges the electronic device, or alternatively the transmission interface and the electronic device perform a power or data transmission of the near-field communication.

2. The transmission interface device according to claim 1, further comprising:
   a grounding unit, electrically connected to the antenna body.

3. The transmission interface device according to claim 1, further comprising:
   a chip, electrically connected to the antenna body, wirelessly charging the electronic device, or alternatively performing the power or data transmission with the electronic device through the electric coupling effect, the magnetic coupling effect, or strong electromagnetic coupling effect.

4. The transmission interface device according to claim 2, wherein the grounding unit is an independent metal grounding plane or a grounding plane of a print circuit board.

5. The transmission interface device according to claim 1, wherein the magnetic coupling body is a loop or U-shaped magnetic coupling body, therefore at least covering or surrounding the portion of the electric coupling body.

6. The transmission interface device according to claim 1, wherein the electric coupling body is plate dipole antenna or a planar inverted-F antenna.

7. The transmission interface device according to claim 1, wherein the antenna body and the antenna of the electronic device selectively generate the electric coupling effect, the magnetic coupling effect, or the strong electromagnetic coupling effect according to characteristics of the antenna of the electronic device.

8. A transmission interface system, comprising:
an electronic device; and
a transmission interface device, applied for wirelessly charging or performing a near-field communication with the electronic device, comprising:
an antenna body, comprising:
at least one electric coupling body, generating an electric coupling effect with the electronic device; and
at least one magnetic coupling body independent to the electric coupling body, covering or surrounding at least a portion of the electric coupling body, and generating a magnetic coupling effect with the electronic device;
wherein when an antenna of the electronic device is close to the antenna body, the antenna body and the antenna of the electronic device selectively generate the electric coupling effect, the magnetic coupling effect, or a strong electromagnetic coupling effect, so as to change at least one matching condition for the antenna body and the antenna of the electronic device, such that the transmission interface device wirelessly charges the electronic device, or alternatively the transmission interface and the electronic device perform a power or data transmission of the near-field communication.

9. The transmission interface system according to claim 8, wherein the transmission interface device further comprises:
a grounding unit, electrically connected to the antenna body.

10. The transmission interface system according to claim 8, wherein the transmission interface device further comprises:
a chip, electrically connected to the antenna body, wirelessly charging the electronic device, or alternatively performing the power or data transmission with the electronic device through the electric coupling effect, the magnetic coupling effect, or strong electromagnetic coupling effect.

11. The transmission interface system according to claim 9, wherein the grounding unit is an independent metal grounding plane or a grounding plane of a print circuit board.

12. The transmission interface system according to claim 8, wherein the magnetic coupling body is a loop or U-shaped magnetic coupling body, therefore at least covering or surrounding the portion of the electric coupling body.

13. The transmission interface system according to claim 8, wherein the electric coupling body is plate dipole antenna or a planar inverted-F antenna.

14. The transmission interface system according to claim 8, wherein the antenna body and the antenna of the electronic device selectively generate the electric coupling effect, the magnetic coupling effect, or the strong electromagnetic coupling effect according to characteristics of the antenna of the electronic device.

15. The transmission interface system according to claim 8, further comprising:
an equipment, connected to the transmission interface device.

16. The transmission interface system according to claim 8, wherein the equipment is an automobile communication interface, a desk, a portable power supply, an appliance, or a computing device, and the transmission interface device is integrated into the equipment.

17. The transmission interface system according to claim 8, wherein the electronic device is a pad, an automobile electronic device, a portable storage device, or a cell phone.

18. The transmission interface system according to claim 8, wherein the electronic device is integrated into a vehicle or an appliance.

19. The transmission interface device according to claim 1, when the antenna of the electronic device is close to the antenna body, the operating frequency of the antenna of the electronic device is changed from a first band to a second band, wherein the first band is not equal to the second band, wherein the first band is the band for the far-field communication and the transmission interface device uses the second band to wirelessly charge the electronic device or perform the near-field communication with the electronic device.

20. The transmission interface device according to claim 19, when the antenna of the electronic device is close to the antenna body, the far-field communication function of the electronic device will be disabled.

21. The transmission interface device according to claim 1, wherein the electric coupling body is located between an inner side of the magnetic coupling body and an outer side of the antenna of the electric device, so that a distance between the magnetic coupling body and the electric device is larger than that between the magnetic coupling body and the electric coupling body.

22. The transmission interface device according to claim 1, wherein when the antenna of the electronic device is close to the antenna body, the operating frequency of the antenna of the electronic device is changed from a first band to a second band, wherein the second band is within the first band, wherein the first band is the band for the far-field communication and the transmission interface device uses the second band to wirelessly charge the electronic device or perform the near-field communication with the electronic device.

23. The transmission interface device according to claim 8, when the antenna of the electronic device is close to the antenna body, the operating frequency of the antenna of the electronic device is changed from a first band to a second band, wherein the first band is not equal to the second band, wherein the first band is the band for the far-field communication and the transmission interface device uses the second band to wirelessly charge the electronic device or perform the near-field communication with the electronic device.

24. The transmission interface device according to claim 23, when the antenna of the electronic device is close to the antenna body, the far-field communication function of the electronic device will be disabled.

25. The transmission interface device according to claim 8, wherein the electric coupling body is located between an inner side of the magnetic coupling body and an outer side of the antenna of the electric device, so that a distance between the magnetic coupling body and the electric device is larger than that between the magnetic coupling body and the electric coupling body.

26. The transmission interface device according to claim 8, wherein when the antenna of the electronic device is close to the antenna body, the operating frequency of the antenna of the electronic device is changed from a first band to a second band, wherein the second band is within the first band, wherein the first band is the band for the far-field communication and the transmission interface device uses the second band to wirelessly charge the electronic device or perform the near-field communication with the electronic device.

\* \* \* \* \*